(12) United States Patent
Vassilieva et al.

(10) Patent No.: US 8,644,704 B2
(45) Date of Patent: Feb. 4, 2014

(54) METHOD AND SYSTEM FOR AN ADAPTIVE CHANNEL GRID OF AN OPTICAL NETWORK

(75) Inventors: Olga I Vassilieva, Plano, TX (US); Motoyoshi Sekiya, Richardson, TX (US); Martin Bouda, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 182 days.

(21) Appl. No.: 13/091,804

(22) Filed: Apr. 21, 2011

(65) Prior Publication Data

US 2012/0269506 A1    Oct. 25, 2012

(51) Int. Cl.
*H04B 10/08* (2011.01)
*H04B 17/00* (2006.01)
*H04J 14/02* (2006.01)

(52) U.S. Cl.
USPC ............. 398/26; 398/25; 398/27; 398/69

(58) Field of Classification Search
CPC .................................. H04J 14/0224
USPC ............ 398/25–27, 69; 369/79
See application file for complete search history.

(56) References Cited

U.S. PATENT DOCUMENTS

| | | | | |
|---|---|---|---|---|
| 5,912,998 A | * | 6/1999 | Quayle | 385/24 |
| 2004/0067067 A1 | * | 4/2004 | Lee et al. | 398/195 |
| 2008/0037990 A1 | * | 2/2008 | Effenberger | 398/67 |
| 2008/0304828 A1 | * | 12/2008 | Mizutani et al. | 398/78 |
| 2009/0220230 A1 | * | 9/2009 | Kim et al. | 398/72 |
| 2010/0183299 A1 | * | 7/2010 | Solheim et al. | 398/34 |
| 2012/0070148 A1 | * | 3/2012 | Patel et al. | 398/49 |
| 2012/0070150 A1 | * | 3/2012 | Patel et al. | 398/79 |
| 2012/0170937 A1 | * | 7/2012 | Van Leeuwen | 398/76 |
| 2012/0201541 A1 | * | 8/2012 | Patel et al. | 398/58 |
| 2012/0251117 A1 | * | 10/2012 | Patel et al. | 398/79 |

OTHER PUBLICATIONS

Bigo et al.; "After today's 100GE transmission in optical network"; ECOC 2010, paper Th9G3; pp. 14, 2010.
Jinno et al.; "Management and Control Aspects of Spectrum Sliced Elastic Optical Path Network (SLICE)"; ECOC 2010, Workshop; pp. 22, 2010.
Jinno et al.; "Demonstration of Novel Spectrum-Efficient Elastic Optical Path Network with Per-Channel Variable Capacity of 40 Gb/s to Over 400 Gb/s"; ECOC 2010, paper Th.3.F.6; pp. 2, 2010.
Kozicki et al.; "Distance-Adaptive Spectrum Allocation in Elastic Optical Path Network (SLICE) with Bit per Symbol Adjustment"; ECOC 2010, paper OMU3; pp. 3, 2010.
Yonenaga et al.; "Bit-Rate-Flexible All-Optical OFDM Transceiver Using Variable Multi-Carrier Source and DQPSK/DPSK Mixed Multiplexing"; ECOC 2010, paper OWM1; pp. 3, 2010.

\* cited by examiner

*Primary Examiner* — Leslie Pascal
*Assistant Examiner* — Casey Kretzer
(74) *Attorney, Agent, or Firm* — Baker Botts L.L.P.

(57) ABSTRACT

In accordance with an embodiment of the present disclosure a method for adaptively spacing channels of an optical network comprises determining a first desired power level of a first channel of an optical network. The method further comprises determining a second desired power level of a second channel of the optical network, the second desired power level being less than the first desired power level. Additionally, the method comprises determining a first spectral space between the first channel and one or more channels neighboring the first channel based at least on the first desired power level. The method also comprises determining a second spectral space between the second channel and one or more channels neighboring the second channel based at least on the second desired power level, the second spectral space less than the first spectral space.

24 Claims, 3 Drawing Sheets

METHOD AND SYSTEM FOR AN ADAPTIVE CHANNEL GRID OF AN OPTICAL NETWORK

TECHNICAL FIELD

The present disclosure relates generally to optical networks, more particularly, to a system and method for an adaptive channel grid of an optical network.

BACKGROUND

Telecommunications systems, cable television systems and data communication networks use optical networks to rapidly convey large amounts of information between remote points. In an optical network, information ("traffic") is conveyed in the form of optical signals through optical fibers. The optical signals may comprise a beam of light having a specific wavelength and having the traffic modulated onto the beam. In some instances a wavelength configured to carry information may be referred to as an "optical channel" or a "channel." Each channel may be configured to carry a certain amount of information through an optical network at a particular data rate.

To increase the information carrying capabilities of an optical network, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber.

An optical network may be configured to operate within a particular transmission band of the optical spectrum. For example the transmission band in North America may be referred to as the C-band and may include optical wavelengths between approximately 1525 and 1565 nanometers (nm). In some optical networks, the spectral spacing of channels may be fixed such that the number of channels within the transmission band of an optical network may also be fixed. Additionally, the channels may have a maximum data rate that limits the amount of traffic that may be sent per channel. Accordingly, the maximum capacity of an optical network may be limited by the fixed maximum number of channels within the transmission band of the network and the maximum data rate per channel.

SUMMARY

In accordance with the present disclosure, disadvantages and problems associated with fixed channel spacing may be reduced. In accordance with an embodiment of the present disclosure a method for adaptively spacing channels of an optical network comprises determining a first desired power level of a first channel of an optical network. The method further comprises determining a second desired power level of a second channel of the optical network, the second desired power level being less than the first desired power level. Additionally, the method comprises determining a first spectral space between the first channel and one or more channels neighboring the first channel based at least on the first desired power level. The method also comprises determining a second spectral space between the second channel and one or more channels neighboring the second channel based at least on the second desired power level, the second spectral space less than the first spectral space.

BRIEF DESCRIPTION OF THE DRAWINGS

For a more complete understanding of the present disclosure and its features and advantages, reference is now made to the following description, taken in conjunction with the accompanying drawings, in which:

FIGS. 3b and 3c illustrate the variable channel spacing between the channels of FIG. 3a;

DETAILED DESCRIPTION

Figure 1:
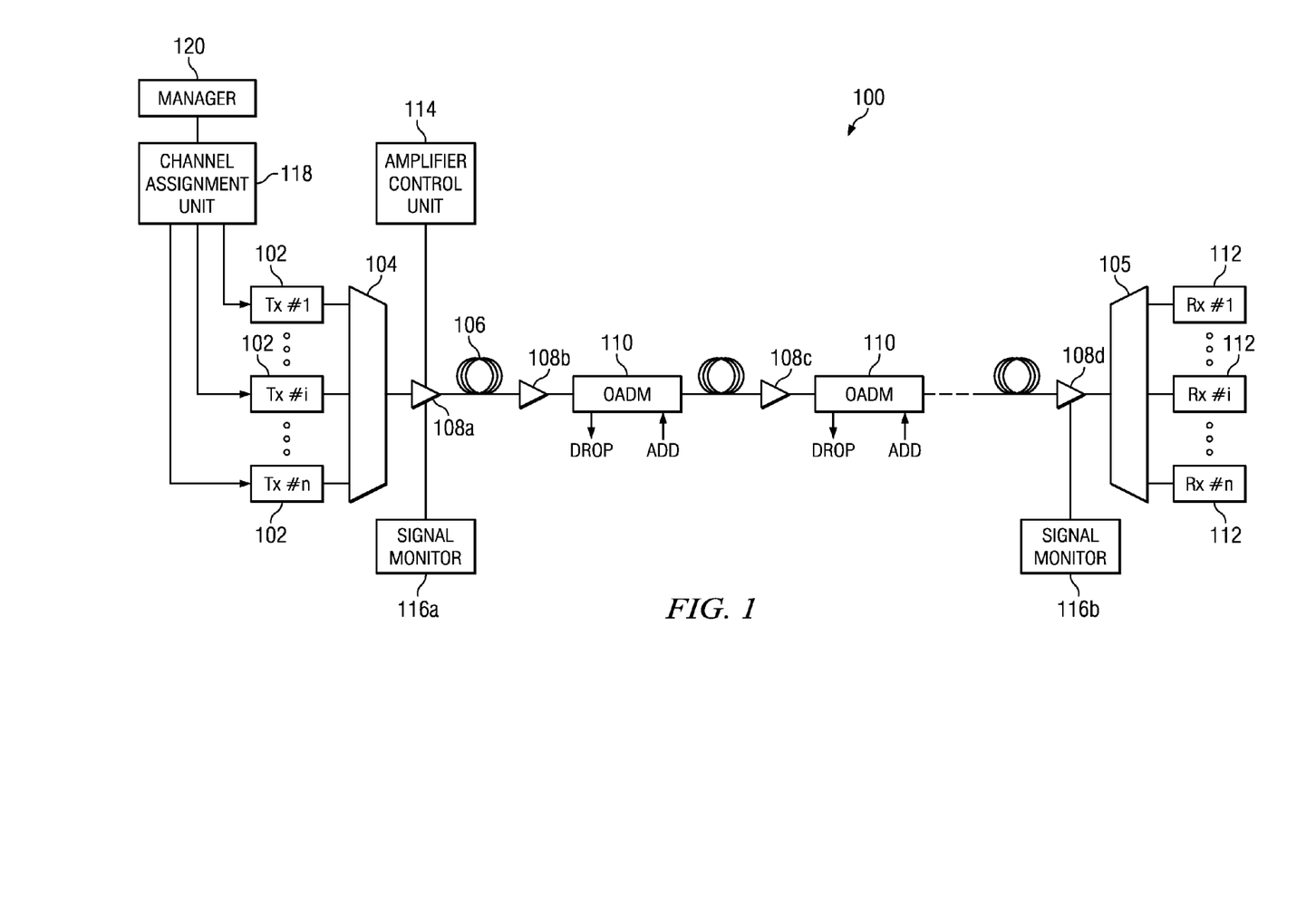
FIG. 1 illustrates an example embodiment of an optical network configured according to a variable channel grid.

FIG. 1 illustrates an example embodiment of an optical network 100 configured to according to a variable channel grid. As discussed further below, the variable grid may decrease the channel spacing between one or more channels of network 100 compared to conventional optical networks that may incorporate fixed channel spacing for all channels. The decreased channel spacing may increase the number of channels within the transmission band of network 100 compared to the number of channels having fixed spacing within the same transmission band. Therefore, the variable channel grid may increase the data capacity of network 100 over conventional networks. The channel spacing may be based on the transmitting power of each channel in network 100. Therefore, to adaptively set the channel spacing, the power of each channel may be adaptively set according to various parameters such as the propagation distance of signals associated with each channel and/or the number of components that a signal may pass through.

Optical network 100 may include one or more optical fibers 106 configured to transport one or more optical signals communicated by components of optical network 100. The network elements of optical network 100, coupled together by fibers 106, may comprise one or more transmitters 102, one or more multiplexers (MUX) 104, one or more amplifiers 108, one or more optical add/drop multiplexers (OADM) 110, and one or more receivers 112.

Optical network 100 may comprise a point-to-point optical network with terminal nodes, a ring optical network, a mesh optical network, or any other suitable optical network or combination of optical networks. Optical fibers 106 comprise thin strands of glass capable of communicating the signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical network 100 may include devices configured to transmit optical signals over fibers 106. Information may be transmitted and received through network 100 by modulation of one or more wavelengths of light to encode the information on the wavelength. In optical networking, a wavelength of light may also be referred to as a channel. Each channel may be configured to carry a certain amount of information through optical network 100 at a certain data rate.

The data rate of a channel may be related to the modulation technique used for the particular channel. For example, in 10 Gigabit (10 G) Ethernet applications, on-off keying (OOK) may be utilized to convey information using two modulation levels. In a 40 G Ethernet application, Quadrature Phase-shift Keying (QPSK) may be used to convey information using four modulation levels to increase the information carrying capabilities of a channel over a two level modulation technique such as OOK. Further, in a 100 G Ethernet application, Dual-polarization QPSK (DP-QPSK) may be used to convey information using four modulation levels for two polarization states to further increase the information carrying capabilities of a channel. Therefore, various modulation techniques may be used to increase the spectral efficiency of a channel, which may also increase the information carrying capabilities of network 100.

Additionally, to increase the information carrying capabilities of optical network 100, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the data rate of solely one channel. With more bandwidth, optical networks are capable of transmitting greater amounts of information. Optical network 100 may be configured to transmit disparate channels using WDM, DWDM, or some other suitable multi-channel multiplexing technique, and to amplify the multi-channel signal. Therefore, it may be advantageous to increase the number of channels in network 100 to increase the transmitting capacity of network 100.

The number of channels in network 100 may be increased by reducing the spectral spacing between some of the channels such that more channels may be included within the transmission band of network 100. The transmission band of network 100 may refer to a portion of the optical spectrum that includes a range of wavelengths that network 100 is configured to operate within. For example the transmission band in North America may be referred to as the C-band and may include optical wavelengths between approximately 1525 and 1565 nanometers (nm).

The spectral spacing of channels may be related to non-linear effects (e.g., cross-talk) exerted by each channel on neighboring channels such that the closer the spacing between channels, the more channels may interfere with each. The transmission power of each channel may also affect the non-linear effects such that the higher the power of each channel, the more the channels may interfere with each other. Accordingly, to decrease the spacing between channels, it may be advantageous to reduce the power of one or more channels.

Channel power may be related to the optical signal to noise ratio (OSNR) of network 100. The OSNR may relate to the ratio of signal power with respect to noise power that may corrupt the signal. The signal power of each channel may need to be sufficiently high to overcome the noise such that the traffic carried by the signal may be extracted from the signal (i.e., the signal may need to have a high enough OSNR).

The OSNR may be a function of signal propagation distance. As optical signals propagate, the amount of noise affecting the signal may increase with the distance travelled by the signal and/or the number of nodes that the signal may pass through. A node may refer to any number of components that an optical signal may pass through. As way of example, and without limitation, a node may comprise a multiplexer 104, an amplifier 108, an optical add/drop module 110, a demultiplexer 105 (all described further below), or may include any combination thereof.

For example, the signal power may experience span loss while propagating through fibers 106. Additionally, each amplifier 108 (described further below) may introduce noise through amplification. Further, as the signal passes through various other nodes, each node may introduce other noise. Accordingly, the power of an optical signal travelling long distances and/or passing through more nodes may need to be higher than the power of an optical signal travelling shorter distances and/or through fewer nodes to maintain a sufficiently high OSNR.

As discussed in further detail below, network 100 may be configured to adaptively establish a channel grid based on power requirements of each channel. The power of each channel may be based on the distance travelled by each channel and/or the number of nodes each channel may pass through, whereas conventional networks may transmit optical signals at a fixed power level regardless of actual propagation distances and/or number of nodes. Many times the number of nodes may also be related to the propagation distance. For example, in instances where the propagation distance of a channel is shorter than the propagation distance of another channel, the signals associated with the channel having a smaller propagating distance may experience less span loss, be amplified less and may pass through fewer nodes than a signal associated with a channel having a longer propagation distance. Accordingly, the power of the channel having a smaller propagation distance may be reduced while maintaining a sufficiently high OSNR.

The channel having a reduced power may also have less cross-talk interference with neighboring channels and thus the neighboring channels may be spectrally spaced closer to the channel with reduced power. Accordingly, the spectral spacing between one or more channels within the transmission band of an optical network may be reduced by adapting channel power according to actual transmission distances and/or nodes associated the channels. With the channel grid based on the variable channel power and spacing, the channel spacing may be smaller than the fixed channel spacing of conventional networks. As mentioned above, a decrease in channel spacing may increase the number of channels within a transmission band that are carrying traffic, which may increase the traffic carrying capacity of network 100 as compared to conventional networks. Optical network 100 may include one or more optical transmitters (Tx) 102 configured to transmit optical signals through optical network 100 in specific wavelengths or channels. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network. Each transmitter 102 may be assigned to a particular channel by a channel assignment unit 118 communicatively coupled to each transmitter. Therefore, each transmitter may be configured to transmit the optical signal at a wavelength associated with its associated channel as assigned by channel assignment unit 118.

In the present embodiment, transmitters 102 may comprise tunable transmitters capable of being tuned to transmit optical signals at a plurality of wavelengths. As discussed in further detail below, each transmitter 102 may be tuned to a determined center frequency of a channel associated with an adaptive channel grid. Therefore, by being tunable, transmitters 102 may allow for variable channel spacing between one or more channels by being adaptable to transmit at the required center frequency of a channel where the spacing between center frequencies may change (thus changing the center frequencies themselves of some channels) due to an adaptive channel grid.

Channel assignment unit 118 may comprise any system, device, or apparatus configured to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, channel assignment unit 118 may interpret and/or execute program instructions and/or process data (e.g., channel assignment instructions) stored in memory communicatively coupled to channel assignment unit 118 (not expressly shown).

Memory may comprise any system, device or apparatus operable to retain program instructions or data for a period of time (e.g., computer-readable media). Memory may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to channel assignment unit 118 is turned off.

In the present embodiment, channel assignment unit 118 may be configured to assign a channel to each transmitter 102. Channel assignment unit 118 may be configured to assign and space the channels based on channel power associated with the propagation distance of its transmitted signal. In some embodiments, channel assignment unit 118 may be configured to tune transmitters 102 to transmit signals at the center frequencies or wavelengths associated with their assigned channels.

As previously discussed, interference between channels, such as non-linear effects, may be a function of channel spacing and channel power. Accordingly, in instances where the channel power is reduced due to a shorter propagation distance, neighboring channels may be spaced closer to the reduced power channel while maintaining the proper OSNR. For example, in some embodiments channel assignment unit 118 may tune transmitters 102 associated with the neighboring channels of the lower power channel such that their center frequencies are moved closer to the center frequency of the lower power channel. Therefore, the spacing between the lower power channel and its neighboring channels may be reduced.

Channel assignment unit 118 may be configured to receive channel assignment information from a network manager 120 communicatively coupled to channel assignment unit 118 and configured to determine the channel grid.

Network manager 120 may comprise any suitable system, apparatus, or device configured to manage the transmission of signals within network 100. Manager 120 may be configured to establish a channel grid by determining channel spacing based on propagation distances, number of nodes each channel passes through, OSNR requirements of each channel and/or power levels of each channel. Similarly to channel assignment unit 118, manager 120 may include without limitation a microprocessor, microcontroller, digital signal processor (DSP), application specific integrated circuit (ASIC), or any other digital or analog circuitry configured to interpret and/or execute program instructions and/or process data. In some embodiments, manager 120 may be configured to execute software stored on memory and configured to manage the transmission of signals within network 100. For example, network manager 120 may be configured to execute Fujitsu Netsmart™ software to manage optical network 100. In the present embodiment, manager 120 may be configured to determine the noise of each channel based on propagation distances of each channel, the number of nodes that each node pass through, and/or any other suitable criteria. Manager 120 may accordingly determine the necessary power level of each channel such that the OSNR is sufficiently high to maintain the data integrity of the channel. Manager 120 may determine the channel spacing and assignment information of the channels based on the power of each channel and the non-linear effects associated with the power levels of the channels. Based on the channel spacing and the transmission band of the optical network, manager 120 may establish a variable channel grid. As discussed above, in some instances the channel spacing and channel grid may be established by establishing the center transmission frequencies or wavelengths of each transmitter 102 based on the adaptive channel grid. Therefore, in instances where the channel spacing is closer together, the difference between the center frequencies of the associated transmitters 102 may be smaller and in instances where the channel spacing is further apart, the difference between the center frequencies of the associated transmitters 102 may be larger.

Accordingly, manager 120 may establish a variable channel grid of network 100 based on the power requirements for each channel. In some instances, the variable channel grid may include more channels than a conventional fixed channel grid with fixed channel spacing due to the flexibility surrounding channel spacing.

Manager 120 may communicate the channel grid that includes channel spacing and assignment information to channel assignment unit 118 such that channel assignment unit may assign each transmitter 102 to a channel associated with the variable channel grid. Manager 120 may also communicate the power information to one or more amplifier control units 114 associated with amplifiers 108 and configured to control the amplification performed by amplifiers 108, as discussed further below.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 100 according to the required power levels of each channel as determined by manager 120. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed without opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, amplifiers 108 may comprise an erbium-doped fiber amplifier (EDFA). However, any other suitable amplifier, such as a semiconductor optical amplifier (SOA), may be used.

In the present embodiment amplifiers 108 may each comprise a per channel adjustable power amplifier configured to amplify each channel according to the required power levels as determined by manager 120. Amplifiers 108 may amplify the individual channels as directed by an amplifier control unit 114 communicatively coupled to each amplifier 108. The present example expressly depicts and describes amplifier control unit 114 associated with amplifier 108a, however it is understood that amplifiers 108b-108d may also be associated with an amplifier control unit configured to perform similar operations.

Amplifier control unit 114 may comprise any suitable system, apparatus or device configured to adjust the power of amplifier 108a. Amplifier control unit 114 may be configured to adjust the power of amplifier 108a by controlling functions such as gain tilt, power level, etc. Amplifier control unit 114 may be configured to direct amplifier 108a to amplify each individual channel according to the required power levels of each channel as determined by manager 120. As mentioned above, controller 120 may determine the desired power level of a channel based on the signal propagation distance of the channel, and/or the number of nodes (e.g., amplifiers 108, optical add/drop modules (OADMs) 110, etc.) the channel may pass through. Accordingly, amplifier control unit 114 may receive instructions from manager 120 indicating the desired power level of each channel determined according to the propagation distance of each channel and/or nodes associated with each channel.

Network 100 may also include one or more signal monitors 116. Although expressly depicted as being associated with amplifiers 108a and 108d, it is understood that network 100 may include one or more signal monitors associated with each amplifier 108, at any portion of network 100 where a signal may be received, or any combination thereof. Signal monitors 116 may comprise any suitable system, apparatus or device configured to monitor parameters of an optical signal. For example, signal monitors 116 may be configured to monitor power levels of an optical signal, OSNR of the signal, bit error rate (BER) of a signal, any other parameter, or any combination thereof. These operations may be made at the receiving end and/or transmitting end of an optical network. Signal monitors 116 may be communicatively coupled to manager 120 (not expressly shown) and may convey the parameter information to manager 120. Manager 120 may determine that channel grid adjustments may be made according to parameter information received from signal monitor 116.

For example signal monitor 116b may measure the bit error rate of a channel leaving amplifier 108d and may convey that information to manager 120. Manager 120 may determine that the bit error rate is sufficiently low that the power of the channel may be reduced and still maintain signal integrity. Manager 120 may accordingly direct amplifier control unit 114 to reduce the power of amplifier 108a for the channel. Additionally, manager 120 may direct amplifier control units associated with amplifiers 108b, 108c and 108d (not expressly shown) to also reduce the power for the channel. In some instances, manager 120 may determine that channel spacing may be decreased based on the reduced power and may also direct channel assignment unit 118 to accordingly adjust the channel spacing.

OADMs 110 may be coupled to network 100 via fibers 106 also. OADMs 110 comprise an add/drop module, which may include any system, apparatus or device configured to add and/or drop optical signals from fibers 106. After passing through an OADM 110, a signal may travel along fibers 106 directly to a destination, or the signal may be passed through one or more additional OADMs 110 before reaching a destination. Although not expressly shown, OADMs 110 may each also be associated with a signal monitor 116 configured to monitor various parameters of signals received at each OADM 110.

Network 100 may also include one or more demultiplexers 105 at one or more destinations of network 100. Demultiplexer 105 may comprise any system apparatus or device that may act as a demultiplexer by splitting a single WDM signal into its individual channels. In some embodiments, demultiplexer 105 may comprise a multiplexer 104 but configured to split WDM signals into their individual channels instead of combine individual channels into one WDM signal. For example, network 100 may transmit and carry a forty channel DWDM signal. Demultiplexer 105 may divide the single, forty channel DWDM signal into forty separate signals according to the forty different channels.

Network 100 may also include receivers 112 coupled to demultiplexer 105. Each receiver 112 may be configured to receive signals transmitted in a particular wavelength or channel, and process the signals for the information that they contain. Accordingly, network 100 may include at least one receiver 112 for every channel of the network. Although not expressly shown, receivers 112 may also be associated with a signal monitor 116 configured to monitor various parameters of signals received by receivers 112. Additionally, although not expressly shown, receivers 112 may be coupled to a channel assignment unit similar to channel assignment unit 118. The channel assignment unit may be configured to assign and tune receivers 112 according to the established channel grid such that receivers 112 may receive signals transmitted by transmitters 102.

Modifications, additions or omissions may be made to network 100 without departing from the scope of the disclosure. For example, in some embodiments, each channel in optical network 100 may have the same data rate and in other embodiments one or more channels may have different data rates (e.g., 10 G, 40 G, 100 G, etc.). Further, network 100 may include more or fewer elements than those depicted. Additionally network 100 may include additional elements not expressly shown, such as a dispersion control module. Also, as mentioned above, although depicted as a point to point network, network 100 may comprise any suitable network for transmitting optical signals such as a ring or mesh network.

Figure 2:
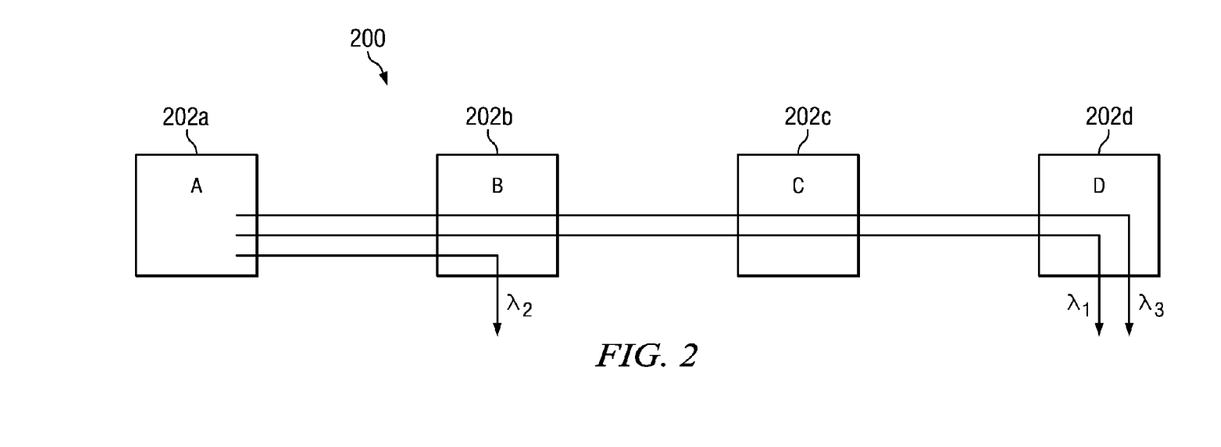
FIG. 2 illustrates a specific example of an optical network with a variable channel grid configured according to the required power levels of one or more channels of the optical network.

FIG. 2 illustrates a specific example of channels associated with optical network 100 with a channel grid configured according to the required power levels of one or more channels of optical network 100. Network elements 202 may comprise nodes of network 100.

For example, network element 202a may be configured to transmit traffic through network 200 and may include one or more transmitters 102, multiplexer 104, amplifier 108a, channel assignment unit 118, amplifier control unit 114 and signal monitor 116 of FIG. 1.

Network elements 202b and 202c may be configured to add and/or drop signals associated with network 200 and may respectively include amplifiers 108b and 108c and OADMs 110 of FIG. 1. Network element 202d may be configured to receive optical signals associated with network 200 and may include amplifier 108d, demultiplexer 105 and receivers 112 of FIG. 1. Network elements 202b-202d may also include amplifier control units and/or signal monitors substantially similar to amplifier control unit 114 and signal monitor 116 of FIG. 1.

Further, although not expressly shown, network elements 202a, 202b, 202c, and 202d may be communicatively coupled to network manager 120 of FIG. 1. In some instances, one or more network elements 202 may include the network manager 120.

In the present embodiment, network elements 202 may be configured to transmit a WDM signal through network 200. The WDM signal may include a plurality of channels including channels λ1, λ2, and λ3. Channels λ1 and λ3 may be transmitted through network 200 from network element 202a to network element 202d via network elements 202b and 202c. Channel λ2 may be transmitted through network 200 from network element 202a to network element 202b. As shown in FIG. 2, the propagation distance between network elements 202a and 202b may be less than the propagation distance between network elements 202a and 202d. Additionally, channel λ2 may pass through fewer network elements 202 than channels λ1 and λ3. Based on the propagation distances and/or the number of network elements associated with the channels, network manager 120 may determine the amount of noise experienced by each channel. Network manager 120 may determine the required amount of power for channels λ1, λ2 and λ3 based on the noise and required OSNR needed to maintain the data integrity of channels λ1, λ2, and λ3.

In the present example, the propagation distance and number of network elements between network elements 202a and 202d may be such that channels λ1 and λ3 may need to be transmitted at full power to maintain a proper OSNR. However, the propagation distance and number of network elements between network elements 202a and 202b may be such that the power of channel λ2 may be reduced. Accordingly, the network manager may determine that the amount of power needed to transmit channel λ2 from network element 202a to network element 202b may be less than the amount of power needed to transmit channels λ1 and λ3 from network element 202a to network element 202d. Network manager 120 may accordingly direct network element 202a to transmit channel λ2 at a lower power than channels λ1 and λ3. Network element 202a may adjust the channel powers with an amplifier and amplifier control unit such as amplifier 108a and amplifier control unit 114 of FIG. 1.

Figure 3A:
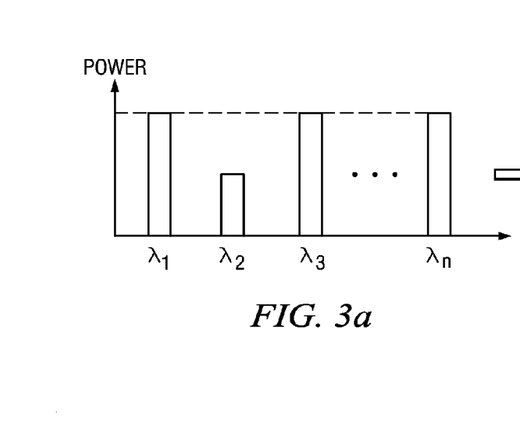
FIG. 3a illustrates an example of power requirements of various channels of FIG. 2.

FIG. 3a illustrates the power requirements of channels λ1, λ2, and λ3 of FIG. 2. As discussed above and as shown by FIG. 3a, the power requirements of channel λ2 may be less than the power requirements of channels λ1 and λ3 due to the number of nodes and/or propagation distance associated with channel λ2 as compared to the number of nodes and/or propagation distances associated with channels λ1 and λ3.

Network manager 120 may also determine the channel spacing based on the channel power. With channel λ2 operating at a lower power than channels λ1 and λ3, the amount of interference and cross-talk between channel λ2 and channels λ1 and λ3 may also be reduced. With the reduced interference between channels, network manager 120 may determine that channels λ1 and λ3 may be spaced closer to channel λ2 and may direct network element 202a to accordingly space the channels. Network manager 120 may assign wavelengths to channels λ1, λ2, and λ3 based on the determined channel spacing. Network manager 120 may accordingly establish a variable channel grid based on the spectral spacing of channels λ1, λ2, and λ3.

Network manager 120 may direct network element 202a to assign channels λ1, λ2, and λ3 to their determined wavelengths based on the variable channel grid. Network element 202a may accordingly transmit channels λ1, λ2, and λ3 at the wavelengths associated with the directed channel spacing and channel grid. Network manager 120 may also direct network elements 202b and 202b to tune their receivers respectively associated with λ1, λ2, and λ3 to the respective wavelengths.

Modifications, additions, or omissions may be made to network 200 without departing from the scope of the present disclosure. For example, although the specific example relates to channel spacing between channels λ1, λ2 and λ3, similar operations may be performed for determining the channel spacing between other channels based on the propagation distance and associated signal power of the channels. Further, as more and more channels may be spaced closer together, it is understood that more channels may be added to network 200.

Figure 3B:
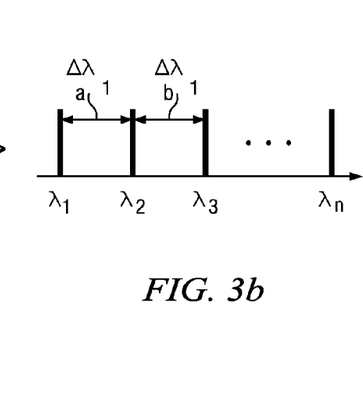
Figure 3C:
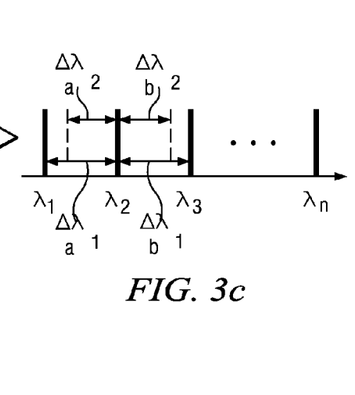

FIGS. 3b and 3c illustrate the reduced channel spacing between channel λ2 and channels λ1 and λ3 due to the reduced power requirements of channel λ2 as compared to channels λ1 and λ3.

FIG. 3b illustrates what the channel spacing between channel λ2 and channels λ1 and λ3 may be if the power requirements of channel λ2 were the same as the power requirements of channels λ1 and λ3 and/or if fixed channel spacing were used. Spacing Δλa1 of FIG. 3b illustrates an example of the spacing between channel λ1 and channel λ2 and spacing Δλb1 illustrates an example of the spacing between channel λ2 and channel λ3 in such a scenario.

FIG. 3c illustrates the channel spacing between channel λ2 and channels λ1 and λ3 where the power requirement of channel λ2 is less than the power requirements of channels λ1 and λ3 and where adaptive channel spacing may be used as illustrated in FIG. 3a and described with respect to FIG. 2. Spacing Δλa2 of FIG. 3c illustrates an example of the spacing between channel λ1 and channel λ2 where the power requirements of channel λ2 are less than the power requirements of channel λ1. Spacing Δλa1 of FIG. 3c illustrates the spacing of channels λ2 and λ1 where the power requirements of the two channels may be the same and/or where fixed channel spacing may be used, as depicted in FIG. 3b. Spacing Δλb2 of FIG. 3c illustrates an example of the spacing between channel λ2 and channel λ3 where the power requirements of channel λ2 are less than the power requirements of channel λ3. Spacing Δλb1 of FIG. 3c illustrates the spacing of channels λ2 and λ3 where the power requirements of the two channels may be the same and/or where fixed channel spacing may be used, as depicted in FIG. 3b.

FIG. 3c illustrates that by spacing channels λ1 and λ2 according to the power requirements of channels λ1 and λ2 and in instances where the power requirements of channel λ2 may be less than the power requirements of channel λ1, spacing Δλa2 may be smaller than spacing Δλa1. FIG. 3c also illustrates that by spacing channels λ2 and λ3 according to the power requirements of channels λ2 and λ3, and in instances where the power requirements of channel λ2 may be less than the power requirements of channel λ3, spacing Δλb2 may be smaller than spacing Δλb1. Accordingly, FIG. 3c also shows that adaptive channel spacing may allow for more channels within a transmission band and variable channel spacing based on power.

Figure 4:
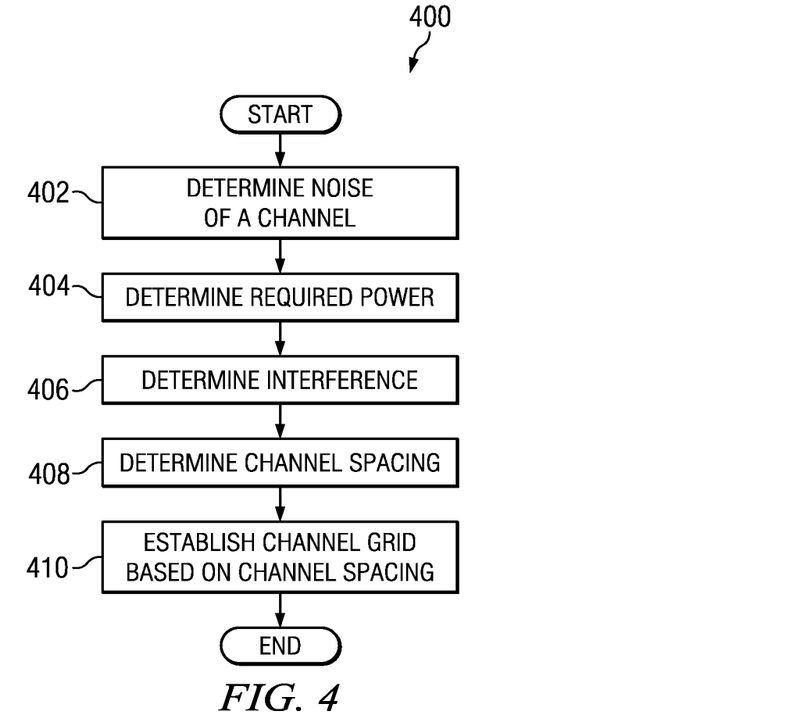
FIG. 4 illustrates an example method for establishing a variable channel grid of an optical network.

FIG. 4 illustrates an example method 400 for establishing a variable channel grid of an optical network. Method 400 may be performed by any suitable system, apparatus or device of the optical network. In the present example, method 400 may be performed by a system manager, such as system manager 120 of FIG. 1.

Method 400 may start at step 402 where a system manager may determine noise experienced by one or more channels of an optical network. The noise may be due to propagation distance, the number of nodes associated with the channel, any other noise inducing factor, or any combination thereof.

At step 404, the system manager may determine the required power for each of the one or more channels based on the noise such that the OSNR for each channel is sufficiently high to maintain data integrity of the channels.

At step 406, the network manager may determine the interference between channels associated with the determined required power for each channel. At step 408, the system manager may determine the channel spacing between channels according to the power and interference of each channel and its surrounding channels.

At step 410, based on the transmission band and the channel spacing, the network manager may establish a variable channel grid. In some instances the variable channel grid may be established by assigning wavelengths to each channel. The difference between wavelengths may vary according to the channel spacing determinations of step 408. Therefore, with the channels being assigned wavelengths based on the variable channel spacing, a variable channel grid may be established.

As discussed above, in the variable channel grid, the spacing between channels may vary according to the power requirements of each channel. In some instances, the variable channel grid may include more channels than a conventional fixed channel grid with fixed channel spacing due to the flexibility surrounding channel spacing. Following step 410, method 400 may end.

Modifications, additions, or omissions may be made to method 400 without departing from the scope of the present disclosure. For example, although the steps have been described in a particular order some steps may be performed in a different order or at the same time. Additionally, some steps may be removed and other steps may be added. Further, each individual step may include one or more sub steps not expressly described. Further as discussed above, in some embodiments, each channel in method 400 may have the same data rate and in other embodiments one or more channels may have different data rates (e.g., 10 G, 40 G, 100 G, etc.).

Although the present disclosure and its advantages have been described in detail, it should be understood that various changes, substitutions and alterations can be made herein without departing from the spirit and scope of the disclosure as defined by the following claims.

What is claimed is:

1. A method for adaptively spacing channels of an optical network comprising:
    determining a first power level of a first channel of an optical network;
    determining a second power level of a second channel of the optical network, the second power level being less than the first power level;
    determining a first spectral space between the first channel and one or more channels neighboring the first channel based at least on the first power level;
    determining a second spectral space between the second channel and one or more channels neighboring the second channel based at least on the second power level, the second spectral space being less than the first spectral space;
    assigning a first wavelength to the first channel based on the first spectral space and assigning a second wavelength to the second channel based on the second spectral space; and
    assigning the first channel to a first optical transmitter configured to transmit a first optical signal at the first wavelength and assigning the second channel to a second optical transmitter configured to transmit a second optical signal at the second wavelength.

2. The method of claim 1, further comprising:
    determining noise associated with the first channel;
    determining the first power level based on the noise associated with the first channel;
    determining noise associated with the second channel; and
    determining the second power level based on the noise associated with the second channel.

3. The method of claim 1, further comprising:
    determining a first propagation distance of the first channel;
    determining the first power level based on the first propagation distance;
    determining a second propagation distance of the second channel; and
    determining the second power level based on the second propagation distance.

4. The method of claim 1, further comprising:
    determining a first interference between the first channel and the one or more channels neighboring the first channel based at least on the first power level;
    determining the first spectral space as a function of the first interference;
    determining a second interference between the second channel and the one or more channels neighboring the second channel based at least on the second power level; and
    determining the second spectral space as a function of the second interference.

5. The method of claim 1, further comprising:
    determining a first required optical signal to noise ratio (OSNR) associated with the first channel;
    determining the first power level of the first channel based on the first required OSNR;
    determining a second required OSNR associated with the second channel; and
    determining the second power level of the second channel based on the second required OSNR.

6. The method of claim 1, further comprising assigning the first channel to a first optical receiver configured to receive the first optical signal at the first wavelength and assigning the second channel to a second optical receiver configured to receive the second optical signal at the second wavelength.

7. The method of claim 1, further comprising determining the first power level based on a first bit error rate of the first channel and determining the second power level based on a second bit error rate of the second channel.

8. The method of claim 1, further comprising:
    determining a first number of nodes associated with the first channel;
    determining the first power level based on the first number of nodes;
    determining a second number of nodes associated with the second channel; and
    determining the second power level based on the second number of nodes.

9. The method of claim 1, further comprising establishing a channel grid of the optical network based on the first spectral space and the second spectral space such that the channel grid is a function of the first power level and the second power level.

10. The method of claim 1, wherein the first channel has a first data rate and wherein the second channel has a second data rate different from the first data rate.

11. An optical network manager configured to:
  determine a first power level of a first channel of an optical network;
  determine a second power level of a second channel of the optical network, the second power level being less than the first power level;
  determine a first spectral space between the first channel and one or more channels neighboring the first channel based at least on the first power level;
  determine a second spectral space between the second channel and one or more channels neighboring the second channel based at least on the second power level, the second spectral space being less than the first spectral space;
  assign a first wavelength to the first channel based on the first spectral space and assigning a second wavelength to the second channel based on the second spectral space; and
  assign the first channel to a first optical transmitter configured to transmit a first optical signal at the first wavelength and assigning the second channel to a second optical transmitter configured to transmit a second optical signal at the second wavelength.

12. The optical network manager of claim 11, further configured to:
  determine noise associated with the first channel;
  determine the first power level based on the noise associated with the first channel;
  determine noise associated with the second channel; and
  determine the second power level based on the noise associated with the second channel.

13. The optical network manager of claim 11, further configured to:
  determine a first propagation distance of the first channel;
  determine the first power level based on the first propagation distance;
  determine a second propagation distance of the second channel; and
  determine the second power level based on the second propagation distance.

14. The optical network manager of claim 11, further configured to:
  determine a first interference between the first channel and the one or more channels neighboring the first channel based at least on the first power level;
  determine the first spectral space as a function of the first interference;
  determine a second interference between the second channel and the one or more channels neighboring the second channel based at least on the second power level; and
  determine the second spectral space as a function of the second interference.

15. The optical network manager of claim 11, further configured to:
  determine a first required optical signal to noise ratio (OSNR) associated with the first channel;
  determine the first power level of the first channel based on the first required OSNR;
  determine a second required OSNR associated with the second channel; and
  determine the second power level of the second channel based on the second required OSNR.

16. The optical network manager of claim 11, further configured to assign the first channel to a first optical receiver configured to receive the first optical signal at the first wavelength and assign the second channel to a second optical receiver configured to receive the second optical signal at the second wavelength.

17. The optical network manager of claim 11, further configured to determine the first power level based on a first bit error rate of the first channel and determine the second power level based on a second bit error rate of the second channel.

18. The optical network manager of claim 11, further configured to:
  determine a first number of nodes associated with the first channel;
  determine the first power level based on the first number of nodes;
  determine a second number of nodes associated with the second channel; and
  determine the second power level based on the second number of nodes.

19. The optical network manager of claim 11, further configured to establish a channel grid of the optical network based on the first spectral space and the second spectral space such that the channel grid is a function of the first power level and the second power level.

20. The optical network manager of claim 11, wherein the first channel has a first data rate and wherein the second channel has a second data rate different from the first data rate.

21. A system for transmitting optical channels with adaptive spacing comprising:
  a first optical transmitter configured to transmit a first channel of an optical network;
  a second optical transmitter configured to transmit a second channel of the optical network;
  an optical amplifier configured to:
    amplify the first channel according to a first power level; and
    amplify the second channel according to a second power level, the second power level being less than the first power level; and
  a channel assignment unit configured to:
    assign a first wavelength to the first channel according to a first spectral space between the first channel and one or more channels neighboring the first channel, the first spectral space based on the first power level; and
    assign a second wavelength to the second channel according to a second spectral space between the second channel and one or more channels neighboring the second channel, the second spectral space based on the second power level and being less than the first spectral space.

22. The system of claim 21, further comprising a network manager communicatively coupled to the channel assignment unit and configured to:
  determine the first spectral space and the second spectral space;
  determine the first wavelength based on the first spectral space;
  determine the second wavelength based on the second spectral space; and
  communicate the first wavelength and the second wavelength to the channel assignment unit.

23. The system of claim 21, wherein the network manager is further configured to establish a channel grid of the optical network based on the first spectral space and the second spectral space such that the channel grid is a function of the first power level and the second power level.

24. The system of claim 21, wherein the first channel has a first data rate and wherein the second channel has a second data rate different from the first data rate.

\* \* \* \* \*